(12) United States Patent
Collins

(10) Patent No.: US 7,073,261 B1
(45) Date of Patent: Jul. 11, 2006

(54) CUT AND GRAB SHEARING HEAD

(76) Inventor: Jason H. Collins, 6626 Capistrano Ave., West Hills, CA (US) 91307

( * ) Notice: Subject to any disclaimer, the term of this patent is extended or adjusted under 35 U.S.C. 154(b) by 65 days.

(21) Appl. No.: 10/885,914

(22) Filed: Jul. 6, 2004

(51) Int. Cl.
*B26B 13/00* (2006.01)

(52) U.S. Cl. .......................................... 30/135; 30/134

(58) Field of Classification Search .................. 30/134, 30/135, 188, 249
See application file for complete search history.

(56) References Cited

U.S. PATENT DOCUMENTS

| | | | |
|---|---|---|---|
| 106,538 A | 8/1870 | Bergner | |
| 108,091 A | 10/1870 | Barbour | |
| 127,279 A | * 5/1872 | Spielman | 30/135 |
| 129,946 A | 7/1872 | Grover | |
| 403,500 A | * 5/1889 | Wingenroth | 30/135 |
| 406,524 A | 7/1889 | Jennings | |
| 562,698 A | 6/1896 | Baisley | |
| 572,644 A | 6/1896 | Lemm | |
| 614,167 A | 11/1898 | Gardella | |
| 778,140 A | 12/1904 | Paff | |
| 835,791 A | 11/1906 | Kelly | |
| 887,494 A | 5/1908 | Mulertz | |
| 1,009,203 A | 11/1911 | Webster | |
| 1,010,784 A | 12/1911 | Morse | |
| 1,123,929 A | 1/1915 | Russell | |
| 1,151,874 A | 8/1915 | Harris | |
| 1,458,878 A | 6/1923 | Dexter | |
| 1,775,086 A | 9/1930 | Bonehill | |
| 2,012,648 A | 8/1935 | Wheeler | |
| 2,064,105 A | 12/1936 | Conlee | |
| 2,582,472 A | 1/1952 | Arrowsmith | |
| 2,775,032 A | 12/1956 | Sorensen | |
| 2,814,869 A | 12/1957 | Matson | |
| 3,336,667 A | 8/1967 | Wallace et al. | |
| 3,688,405 A | 9/1972 | Dutra, Jr. | |
| 3,762,048 A | 10/1973 | Carter | |
| 4,099,326 A | 7/1978 | Mori et al. | |
| 4,117,592 A | 10/1978 | Mori et al. | |
| 4,185,379 A | 1/1980 | Amstutz | |
| 4,464,837 A | 8/1984 | Amstutz | |
| 4,850,110 A | 7/1989 | Meier, Jr. | |
| 5,117,557 A | 6/1992 | Hartley | |
| 5,170,559 A | 12/1992 | Orthey et al. | |
| 5,189,794 A | 3/1993 | Kuo | |
| 5,203,084 A | 4/1993 | Kuo | |
| 5,254,129 A | 10/1993 | Alexander | |
| 5,383,274 A | 1/1995 | Miller | |
| 5,398,415 A | 3/1995 | Collins, Jr. | |

(Continued)

*Primary Examiner*—Hwai-Siu Payer
(74) *Attorney, Agent, or Firm*—Jack C. Munro

(57) ABSTRACT

A cut and grab shearing head for pruning shears or loppers which includes a laterally extending protuberance mounted on one of the jaws of the shears with this laterally extending protuberance having a bottom surface which can be located directly adjacent a resting ledge on the other of the jaws of the shears. Usage of the shears will permit a severed piece of vegetation to be grabbed between the bottom surface and the resting ledge when the jaws are moved from an open position to a closed position. The length of the protuberance is selected so as to leave a pair of spaced apart typical cutting sections which can be utilized in the conventional manner to cut vegetation and not clamp the vegetation.

8 Claims, 2 Drawing Sheets

U.S. PATENT DOCUMENTS

| | | | |
|---|---|---|---|
| 5,461,784 A * | 10/1995 | Baron | 30/135 |
| 5,471,745 A | 12/1995 | Wendell | |
| 5,566,453 A | 10/1996 | Lin | |
| 5,636,443 A | 6/1997 | Linden | |
| D387,647 S | 12/1997 | Linden | |
| 6,314,647 B1 * | 11/2001 | Coxsey | 30/188 |
| 6,634,105 B1 | 10/2003 | Lindermeir | |
| 6,647,627 B1 | 11/2003 | Nickel | |

* cited by examiner

CUT AND GRAB SHEARING HEAD

BACKGROUND OF THE INVENTION

1. Field of the Invention

The present invention relates to a severing implement and particularly to a severing implement that not only cuts an object of vegetation but also is capable of grasping the severed section of vegetation and holding same preventing it from falling free.

2. Description of the Related Art

Pruning shears and loppers that are used to cut vegetation have long been known. Typically such shears are constructed of a pair of jaws which are hingedly mounted relative to each other. Movement of the jaws from an open position to a closed position results in one jaw sliding against the other jaw with there being a cutting edge located between the jaws. An object of vegetation when placed between the jaws is severed when moving of the jaws from an open position to a closed position.

Typical usage of a pair of shears or loppers results in the vegetation being cut falling free to the ground. This requires the user to incur a clean up step of collecting the cut vegetation and placing such usually within some kind of a trash receptacle. Clean up of vegetation can get to be a rather time consuming task if, per chance, the vegetation is being cut extends over a fence and falls into a neighbors yard.

In order to overcome the disadvantage of having vegetation fall free after being cut, it has been common to install in conjunction with the shearing head of the pruning shears or loppers a device that grabs onto the severed piece of vegetation. This will permit the user to carry the severed object of vegetation by the shears or loppers to a trash receptacle to then be dropped within that receptacle. This type of procedure has been found to be particularly desirable especially when dealing with vegetation that has thorns. However, there are times in which operation of the pruning shears it is desirable to operate the shearing head in a normal conventional manner and not grab the vegetation. In those instances, if the shearing head did grab the vegetation that would be undesirable. In the past, shearing heads were either designed to not grab the vegetation or to grab the vegetation, and there has not been constructed a single shearing head which can be utilized to accomplish both within the same shearing head.

SUMMARY OF THE INVENTION

A first basic embodiment of cut and grab shearing head which utilizes a first jaw and a second jaw with the second jaw being hingedly mounted to the first jaw. A cutting edge is formed between the first jaw and the second jaw and sliding movement of the first jaw against the second jaw will permit a severance to occur of an object captured between the first jaw and the second jaw. The second jaw has a resting ledge upon which an object to be severed is to be located. The first jaw has a laterally protruding protuberance which has a bottom surface. The first jaw is capable of movement relative to the severed jaw between a closed position and an open position. When the first jaw is in the closed position and an object is located between the first jaw and the second jaw, the object is clamped between the bottom surface and the resting ledge. The protuberance is substantially shorter in length than the first jaw producing typical cutting sections within the first jaw which permit the object to be severed and not grabbed by the protuberance and the resting ledge.

A further embodiment of the present invention is where the first basic embodiment is modified by the typical cutting sections being defined as a tip section and a base section with the tip section located forward of the protuberance and the base section located aft the protuberance.

A further embodiment of the present invention is where the first basic embodiment is modified by the resting ledge including a series of serrations to facilitate grabbing onto an object.

A further embodiment of the present invention is where the first basic embodiment is modified by the bottom surface including a series of serrations which facilitate grabbing onto an object.

A second basic embodiment of the present invention is directed to a cut and grab shearing head for permitting shears for pruning or loppers for cutting vegetation comprising a pair of interconnected jaws with one jaw of the jaws being slidingly movable in abutting relationship to a remaining jaw of the jaws. One of the jaws has a resting ledge and the other of the jaws has a laterally protruding protuberance. The jaws define a cutting edge. A piece of vegetation is to be inserted between the jaws when the jaws are open, and when the jaws are closed the cutting edge severs the vegetation producing a severed section with the severed section then being clamped between the resting edge and the protuberance preventing such from falling free. The protuberance has a length less than the length of the cutting edge so as to produce a plurality of spaced apart typical cutting sections which can be used to sever vegetation and not clamp same.

A further embodiment of the present invention is where the second basic embodiment is modified by defining the typical cutting sections as comprising a tip section and a base section with the tip section being located forward of the protuberance and the base section located aft the protuberance.

A further embodiment of the present invention is where the second basic embodiment is modified by the resting ledge being defined as having a series of serration to facilitate grabbing onto an object.

A further embodiment of the present invention is where the second basic embodiment is modified by the bottom surface of the protuberance being defined as including a series of serrations which facilitate grabbing onto an object.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
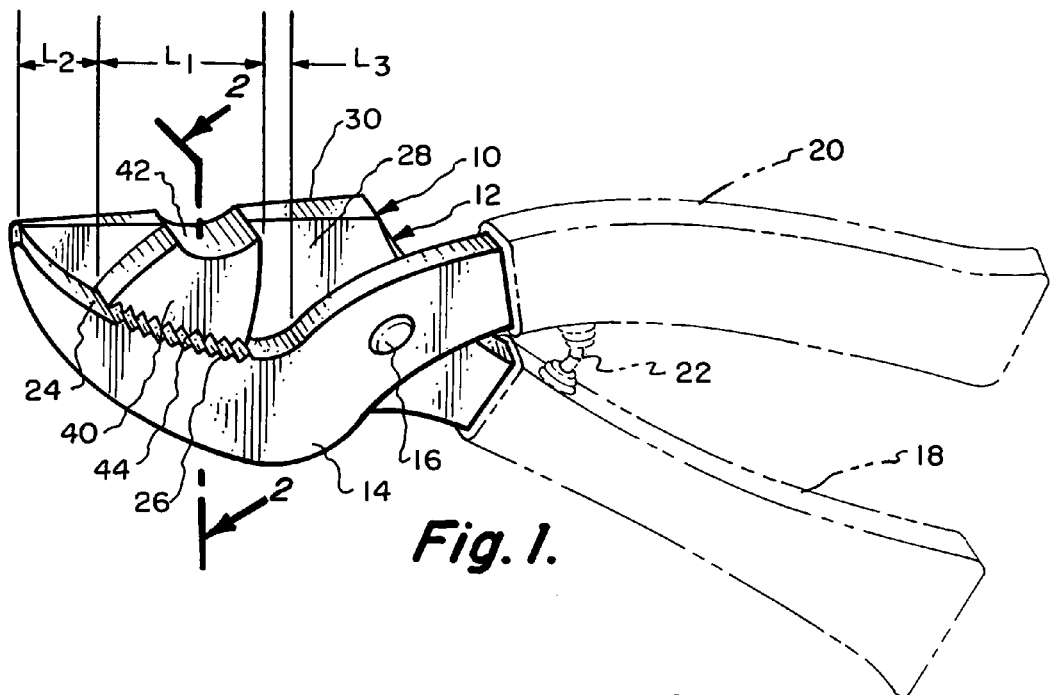
FIG. 1 is a left side isometric view of the cut and grab shearing head of the present invention showing such incorporated in conjunction with pruning shears showing the head in the closed position.

Referring particularly to the drawings, there is shown the shearing head 10 of this invention. The shearing head 10 is defined by a first jaw 12 and a second jaw 14. The second jaw 14 is attached to the first jaw 12 by means of a hinge pin 16. The first jaw 12 is to be connected to some type of handle, such as pruning shear handle 18 shown in FIG. 1. The second jaw 14 is also connected to some type of handle, such as pruning shear handle 20 shown in FIG. 1. It is to be understood that instead of pruning shear handles 18 and 20, there could be utilized other types of handles such as for example handles for loppers. Lopper handles would be substantially longer in length than the pruning shear handles 18 and 20. It is also considered to be within the scope of this invention that another type of handle could be utilized such as, for example, a pliers handle. When utilizing of a plier handle the shearing head 10 would in all probability be designed to not cut vegetation but would be designed to cut other objects, such as possibly dowel rods, small nails, etc. Typically between the handles 18 and 20 there will be located a spring assembly 22 which will function to exert a continuous bias tending to separate the handles 18 and 20 and locate the shearing head 10 in the open position, which is shown in FIG. 3. In order to effect movement of the shearing head 10 to the closed position, it is required to exert a manual force on the handles 18 and 20 moving such toward each other.

The second jaw 14 has a resting ledge 24. The resting ledge 24 defines a transversely flat surface and lengthwise it is slightly arcuate. The resting ledge 24 also includes a series of saw teeth or serrations 26. These serrations 26 are located generally in the central section of the length of the resting ledge 24. This central section is defined by a distance represented as $L_1$. The portion of the resting ledge that is located forward of the serration 26 is defined as a tip section which has a length $L_2$. The portion of the resting ledge 24 that is located aft of the serration 26 (nearer the hinge pin 16) is defined as the base section and it has a length of $L_3$. $L_3$ is shorter in length than $L_2$.

Figure 4:
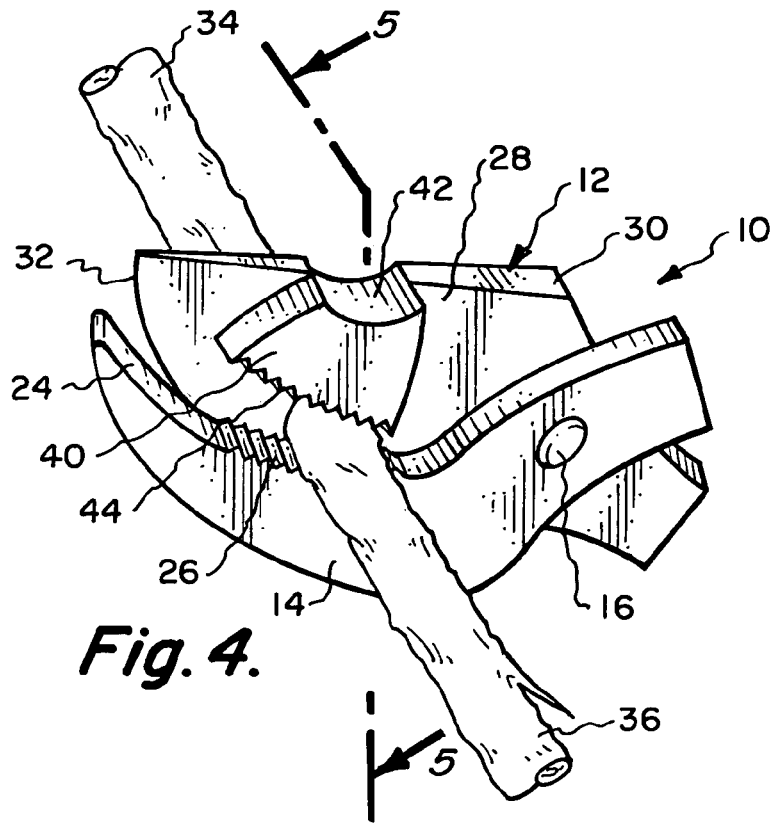
FIG. 4 is an isometric view similar to FIG. 3 but where the jaws are closed and the vegetation is severed and the severed section of vegetation is then clamped.
Figure 5:
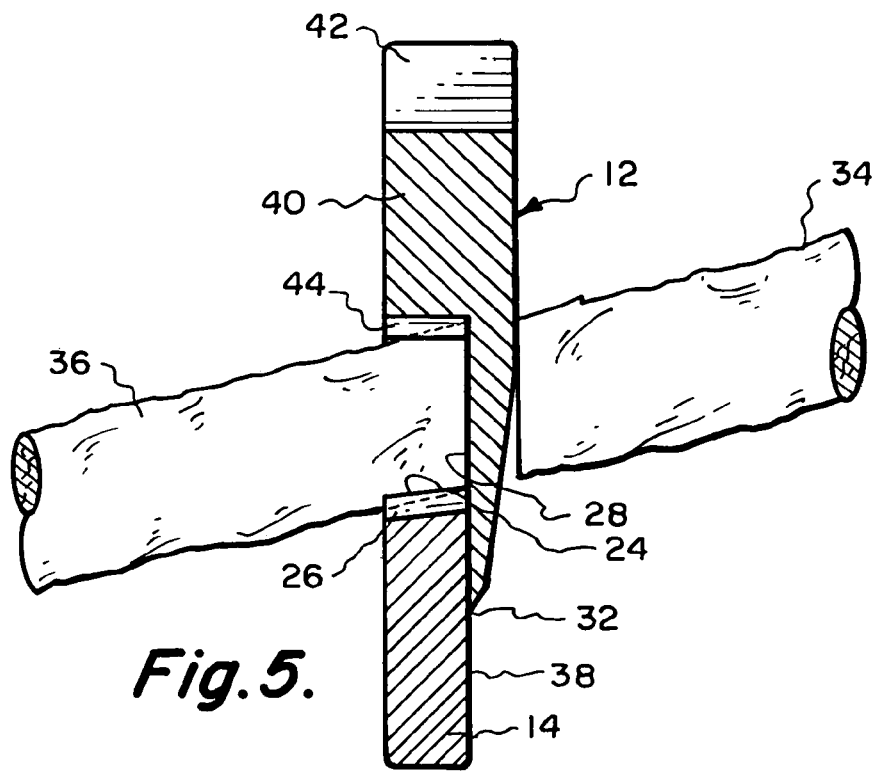
FIG. 5 is a transverse cross-sectional view through the shearing head of the present invention taken along line 5—5 of FIG. 4.

The first jaw 12 has an inner side 28. The inner side 28 terminates in a top ledge 30 and a bottom edge which is defined as the cutting edge 32. The cutting edge 32 is to be sharpened so that when the first jaw 12 is moved from the open position shown in FIG. 3 to the closed position shown in FIG. 4 that the cutting edge 32 will function to sever the object 34 producing a severed section 36. The movement of the cutting edge 32 is accomplished by pivoting of the first jaw 12 relative to the second jaw 14 with the first jaw 12 sliding relative to the second jaw 14. The cutting edge 32 will slide against surface 38 of the second jaw 14.

Integrally mounted on the inner side 28 is a laterally extending protuberance 40. The protuberance 40 has a concavity 42 which extends across the top ledge 30. The purpose of the concavity 42 is to give an indication to the user about the maximum diameter of any twig that can be cut utilizing of the shearing head 10 of this invention. It is to be understood that when using loppers that the concavity 42 could be larger as a larger diameter twig could be cut with loppers than with pruning shears. The protuberance 40 has a bottom surface which is formed into a series of serrations 44. The serrations 44 cooperate with the serrations 26 in order to achieve a secure bite on the object 34 tending to securely hold the same in conjunction with the shearing head 10. Generally, the thickness of the protuberance 40 will be no more than one-quarter to one-half inch. Generally, the thickness of the protuberance 40 will be approximately equal to the thickness of the second jaw 14.

Figures 2, 3:
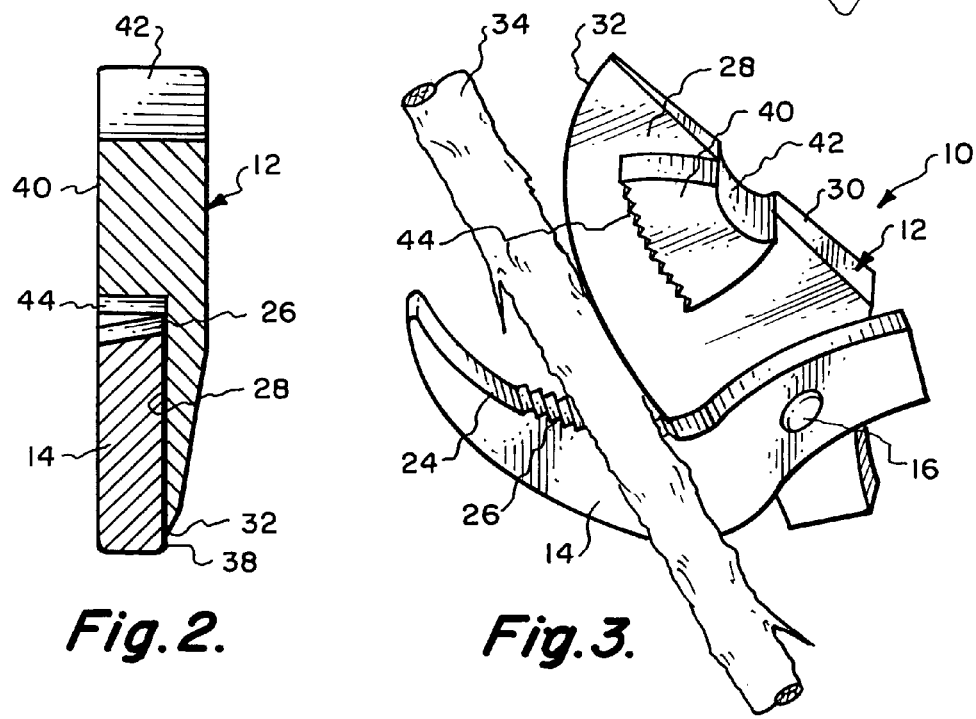
FIG. 2 is a transverse cross-sectional view through the shearing head of the present invention taken along line 2—2 of FIG. 1.
FIG. 3 is a left side isometric view showing the shearing head in the open position with a piece of vegetation located between the jaws of the shearing head which is then to be severed by closing of the jaws.

In referring particularly to FIG. 1, it can be seen that there is a tip section that is located forward of the protuberance 40. Within this tip section, an object can be severed and not be held by the protuberance 40. This tip section has a length $L_2$. Similarly, there is a base section which is located aft the protuberance 40 that has a length $L_3$. An object can be cut within the area of the base section and again not be held by the protuberance 40. At times, it may be desirable to cut vegetation and not grab onto the severed part of the vegetation, and when utilizing of the shearing head 10 the user can locate the vegetation either in the section defined by $L_2$ or $L_3$.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A cut and grab shearing head comprising:
   a first jaw;
   a second jaw, said second jaw hingedly mounted to said first jaw;
   a cutting edge formed between said first jaw and said second jaw, whereby sliding movement of said first jaw against said second jaw will permit a severance to occur of an object captured between said first jaw and said second jaw;
   said second jaw having a resting ledge upon which an object to be severed is to located;
   said first jaw having a laterally protruding protuberance which has a bottom surface, said first jaw capable of movement relative to said second jaw between a closed position and an open position, when said first jaw is in said closed position and an object is located between said first jaw and said second jaw the object is clamped between said bottom surface and said resting ledge, said protuberance being substantially shorter in length than said first jaw producing typical cutting sections which permit an object to be severed and not grabbed by said protuberance and said resting ledge; and said first jaw has a top ledge which includes a concavity which also extends across said protuberance, said concavity comprises an indicator that is to be used by a user to measure twig size that can be cut.

2. The cut and grab shearing head as defined in claim 1 wherein:

said typical cutting sections being defined as a tip section and a base section with said tip section located forward of said protuberance and said base section located aft of said protuberance.

3. The cut and grab shearing head as defined in claim 1 wherein:

said resting ledge including serrations to facilitate grabbing onto an object.

4. The cut and grab shearing head as defined in claim 1 wherein:

said bottom surface including serrations which facilitate grabbing onto an object.

5. A cut and grab shearing head for pruning shears or loppers for cutting vegetation comprising:

a pair of interconnected jaws with one jaw of said jaws being slidingly movable in abutting relationship to a remaining jaw of said jaws, one of said jaws having a resting ledge, the other of said jaws having a laterally protruding protuberance, said jaws defining a cutting edge, a piece of vegetation is to be inserted between said jaws when said jaws are open and then when said jaws are closed said cutting edge severs said vegetation producing a severed section and the severed section is then clamped between said resting ledge and said protuberance preventing such from falling free;

said protuberance having a length less than the length of said cutting edge so as to produce a plurality of spaced apart typical cutting sections which can be used to sever vegetation and not clamp same; and said protuberance having a top ledge which includes a concavity, said concavity comprises an indicator that is to be used by a user to measure twig size that can be cut.

6. The cut and grab shearing head as defined in claim 5 wherein:

said typical cutting sections being defined as a tip section and a base section with said tip section located forward of said protuberance and said base section located aft of said protuberance.

7. The cut and grab shearing head as defined in claim 5 wherein:

said resting ledge including serrations to facilitate grabbing onto an object.

8. The cut and grab shearing head as defined in claim 5 wherein:

said protuberance having a bottom surface which is to be located directly adjacent said resting ledge when said jaws are closed, said bottom surface including a series of serrations which facilitate grabbing onto an object.

* * * * *